(12) United States Patent
Suzuki

(10) Patent No.: US 8,953,204 B2
(45) Date of Patent: Feb. 10, 2015

(54) IMAGE FORMING SYSTEM AND IMAGE FORMING APPARATUS

(71) Applicant: Yuusuke Suzuki, Shizuoka-ken (JP)

(72) Inventor: Yuusuke Suzuki, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 38 days.

(21) Appl. No.: 13/716,749

(22) Filed: Dec. 17, 2012

(65) Prior Publication Data

US 2013/0163044 A1 Jun. 27, 2013

Related U.S. Application Data

(60) Provisional application No. 61/580,390, filed on Dec. 27, 2011.

(51) Int. Cl.
*G06F 3/12* (2006.01)

(52) U.S. Cl.
CPC ............ *G06F 3/1296* (2013.01); *G06F 3/1204* (2013.01); *G06F 3/1239* (2013.01); *G06F 3/1292* (2013.01)
USPC .......................... 358/1.15; 358/1.13; 358/1.14

(58) Field of Classification Search
CPC ... G06F 3/1204; G06F 3/1239; G06F 3/1292; G06F 3/1296

USPC .................................................. 358/1.15, 1.1
See application file for complete search history.

(56) References Cited

U.S. PATENT DOCUMENTS

2012/0268769 A1   10/2012  Kashioka
2012/0274971 A1*  11/2012  Tanabe ......................... 358/1.14
2013/0229677 A1*   9/2013  Nuggehalli et al. ......... 358/1.13

* cited by examiner

*Primary Examiner* — King Poon
*Assistant Examiner* — Iriana Cruz
(74) *Attorney, Agent, or Firm* — Amin, Turocy & Watson, LLP

(57) ABSTRACT

An image forming system comprises a portable terminal includes a communication interface for carrying out communication and a storage device for storing a utilization policy recorded a function which can be utilized by a user and an image forming apparatus includes an image forming unit for forming an image on a recording medium, a communication interface for carrying out the communication, a function table for storing a setting which can be utilized by each function and a control unit for retrieving the function table according to the utilization policy received from the portable terminal, generating capability information that the function which should be provided is selected and sending the capability information to the portable terminal, wherein the portable terminal generates a user interface according to the received capability information.

5 Claims, 5 Drawing Sheets

FIG.4

| function | settings | device default setting | enabled setting | relation | error selection |
|---|---|---|---|---|---|
| PRINT FACE | SIMPLEX, DUPLEX | SIMPLEX | SIMPLEX, DUPLEX | SIMPLEX <DUPLEX | default |
| PRINT COLOR MODE | auto,color, Mono | mono | mono | color<mono <auto | default |
| N in 1 | 1,2,4,6, 8,9,16 | 2 | 1,2,4,6, 8,9,16 | 1<2=4=6= 8=9=16 | default |

FIG.5

| function | value |
|---|---|
| PRINT FACE | DUPLEX |
| PRINT COLOR MODE | mono |
| N in 1 | 2,4,6, 8,9,16 |

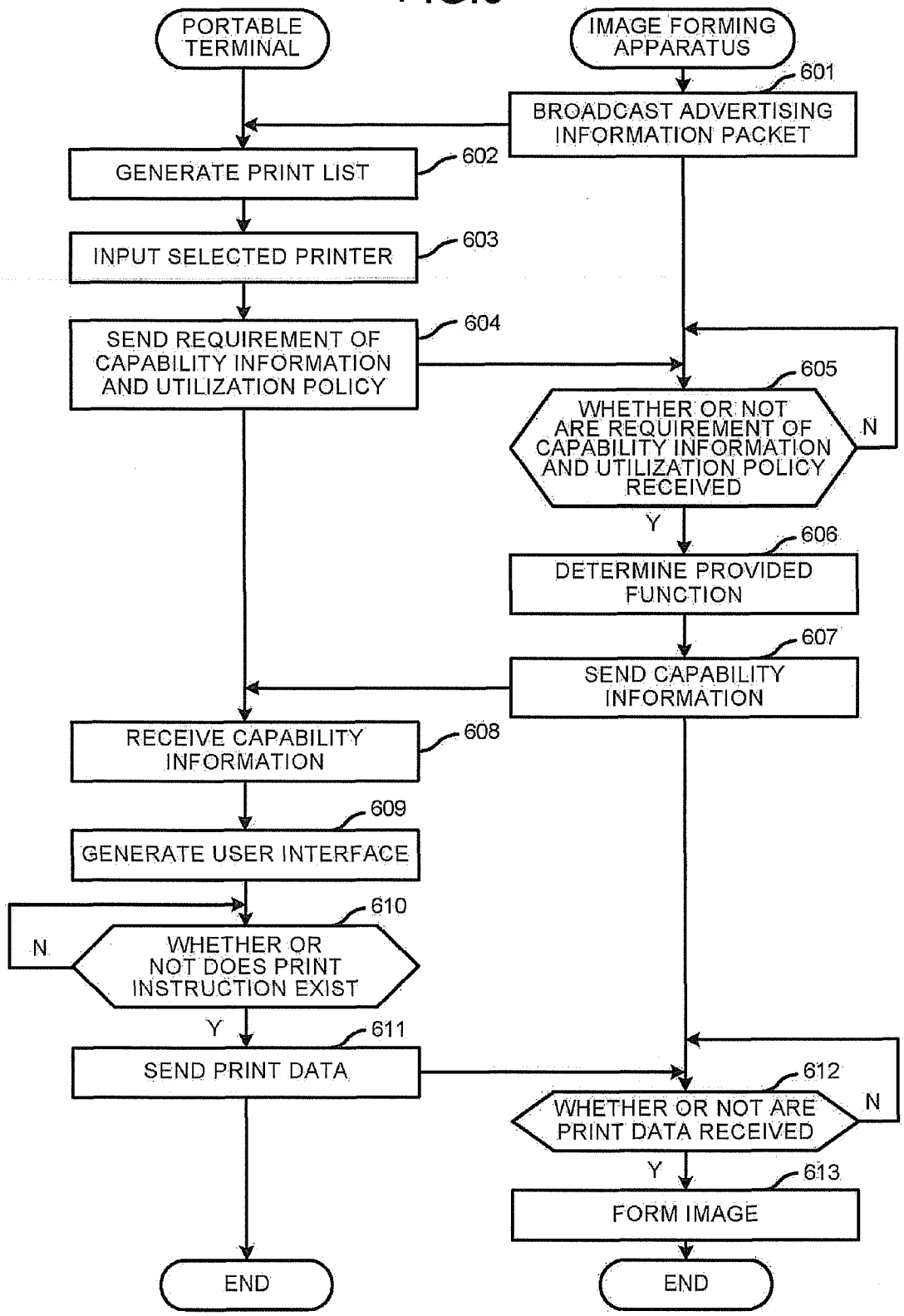

IMAGE FORMING SYSTEM AND IMAGE FORMING APPARATUS

CROSS-REFERENCE TO RELATED APPLICATIONS

This application is based upon and claims the benefit of priority from U.S. Provisional Application No. 61/580,390 filed on Dec. 27, 2011; the entire contents of which are incorporated herein by reference.

FIELD

Embodiments described herein relate to an image forming system and an image forming apparatus.

BACKGROUND

An image forming apparatus such as a copier or a printer and the like has a variety with abundant functions. However, for the purpose of reducing cost or strengthening security, these functions are necessary to be limited.

Formerly, a technology setting an authority according to each user or each user variety and limiting the function of the image forming apparatus, which can be utilized by the user, according to the authority was known.

However, according to this technology, for example, even for the user temporarily utilizing the image forming apparatus due to a business trip and the like, the user registration and the registration of the authority is needed.

BRIEF DESCRIPTION OF THE DRAWINGS

FIG. 4 is a drawing denoting a data structure of a function table that the image forming apparatus has;
FIG. 5 is a drawing denoting an example of the utilization policy;
and
FIG. 6 is a flow chart denoting actions of a utilization function regulation of the image forming apparatus based on the utilization policy.

DETAILED DESCRIPTION

Hereinafter, the embodiment of the image forming system and the image forming apparatus will be described in detail with reference to the drawings.

In accordance with an embodiment, an image forming system comprises a portable terminal includes a communication interface for carrying out communication and a storage device for storing a utilization policy recorded a function which can be utilized by a user and an image forming apparatus includes an image forming unit for forming an image on a recording medium, a communication interface for carrying out the communication, a function table for storing a setting which can be utilized by each function and a control unit for retrieving the function table according to the utilization policy received from the portable terminal, generating capability information that the function which should be provided is selected and sending the capability information to the portable terminal, wherein the portable terminal generates a user interface according to the received capability information.

Figure 1:
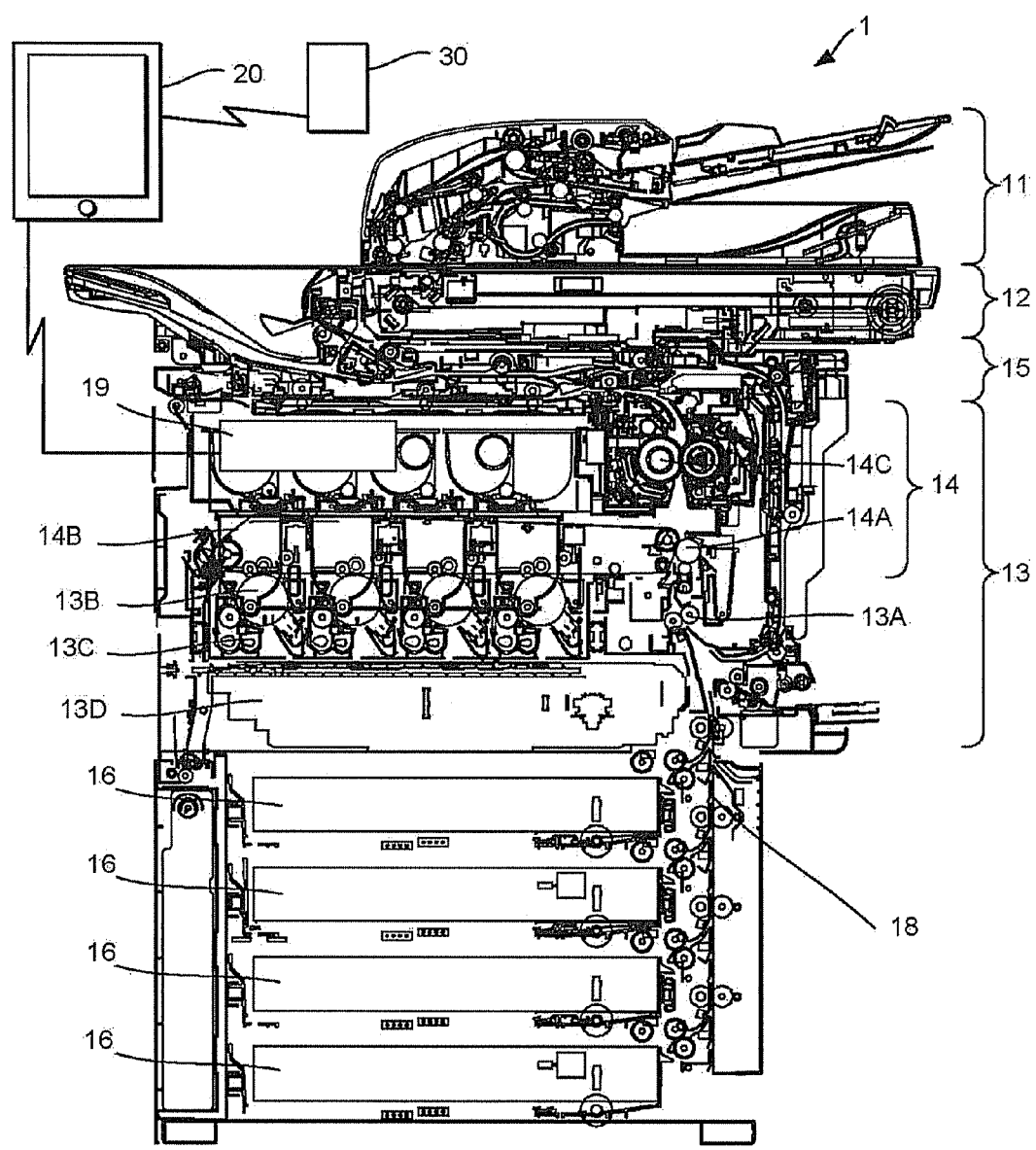
FIG. 1 is a drawing denoting a structure of an image forming apparatus.

FIG. 1 is a drawing denoting a structure of the image forming apparatus 1 of the present embodiment. As shown in FIG. 1, the image forming apparatus 1 includes an automatic original feeding unit 11, an image reading unit 12, an image forming unit 13, a paper feed unit 16, a recording medium conveyance mechanism 18 and a control unit 19.

The automatic original feeding unit 11 is arranged at the upper part of a main body of the image forming apparatus 1 in an openable-closeable way. The automatic original feeding unit 11 includes an original conveyance mechanism taking out originals from a paper feed tray one by one and conveying the originals to a paper discharge tray.

The automatic original feeding unit 11 conveys the originals to an original reading unit of the image reading unit 12 one by one by an original conveyance function. In addition, the automatic original feeding unit 11 can be also opened to bear the originals on an original board of the image reading unit 12.

The image reading unit 12 includes a carriage comprising an exposing lamp exposing the originals and a first reflecting mirror, a plurality of second reflecting mirrors acting in accordance with the action of the carriage, a lens block, and a CCD (Charge Coupled Device) of an image reading sensor.

The carriage is stationary at the original reading unit or is moved to and fro below the original board, so that the first reflecting mirror reflects the light of the exposing lamp, which is reflected by the originals. The plurality of second reflecting mirrors enable the lens block to reflect the reflected light of the first reflecting mirror. The lens block alters the scale factor of the reflected light and outputs the reflected light to the CCD. The CCD converts incident light into an electric signal and outputs the electric signal to the image forming unit 13 as an image signal.

The image forming unit 13 includes a register roller 13A correcting the orientation of the recording medium, so that the side of the width direction of the recording medium obliquely conveyed is parallel to the conveyance direction of the recording medium.

The image forming apparatus 1 forms the image by the image forming unit 13 on the recording medium whose origination is corrected by the register roller 13A.

An image forming method of the image forming unit 13 can be any one method. The image forming method of the image forming unit 13, for example, can be selected from a way such as an electronic way, an ink jet way and the like.

When the image forming method is the electronic way, the image forming unit 13 includes a laser irradiation unit 13D, a photosensitive drum 13B as an electrostatic latent image carrier, a developing material feed unit 13C and a transfer unit 14 according to a yellow Y, a carmine M, a blue green C and a black K.

The laser irradiation unit 13D irradiates laser light on the photosensitive drum 13B according to the image signal to form an electrostatic latent image on the photosensitive drum 13B. The developing material feed unit 13C feeds a developing material to the photosensitive drum 13B, and a developing material image is formed according to the electrostatic latent image.

The paper feed unit 16 takes out the recording medium from a paper feed box one by one to feed to a paper conveyance mechanism. The paper conveyance mechanism conveys the recording medium to the transfer unit 14.

The transfer unit 14 includes a transfer belt 14B and a transfer roller 14A. The transfer belt 14B as an image carrier accepts the transfer to carry the developing material image of the photosensitive drum 13B. The transfer roller 14A applies a voltage to transfer the developing material image of the transfer belt onto the conveyed recording medium.

The image forming apparatus 1 includes a fixing device 14C at the lower reach of the conveyance direction of the recording medium of the transfer unit 14. The fixing device 14C heats, pressurizes and fixes the developing material image on the recording medium.

The recording medium on which the image is formed is fed to a correcting unit 15 in a translation way.

When the image forming method is the ink jet type, the image forming unit 13 includes a head jetting ink to the recording medium.

The head includes piezoelectric elements whose polarities are different and which are stuck in a length direction, and the stuck piezoelectric elements are arranged into an ink feed chamber in the tooth shape of a comb, and a cover comprising an ink jetting hole and covering the ink feed chamber. The image forming unit 13 deforms the ink feed chamber by alternately applying the voltage to the head and repeats the attraction of the ink and the jet from the ink jetting hole. The jetted ink is adhered onto the recording medium, and the image formation is completed.

The image forming unit 1 includes the communication interface (hereinafter, calling the interface as I/F) connected with the control unit 19. The image forming apparatus 1 is connected with the portable terminal 20 of the user through the communication I/F.

The portable terminal 20 is connected with a utilization policy originating unit 30.

Figure 2:
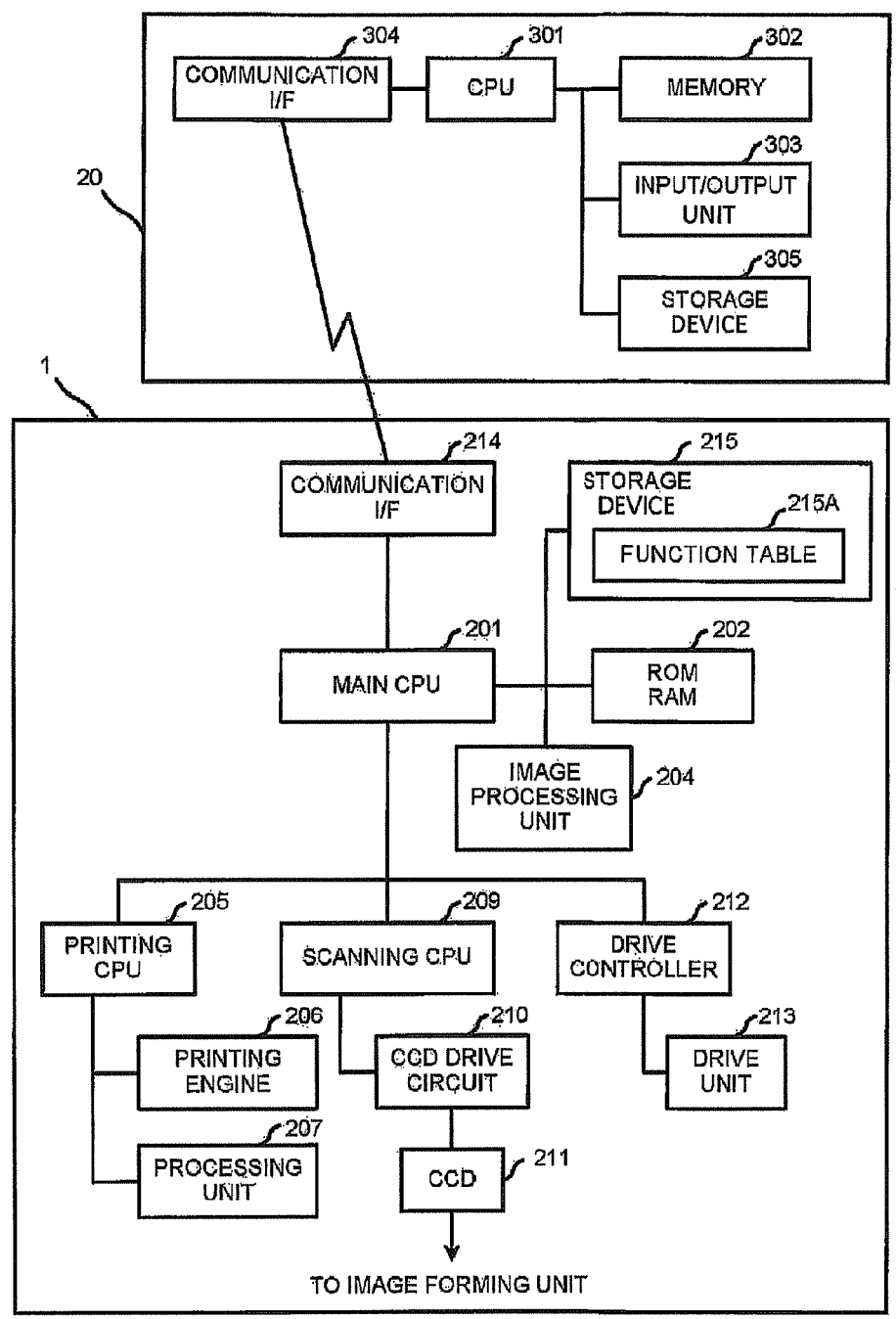
FIG. 2 is a block diagram denoting structures of the image forming apparatus and a portable terminal.

FIG. 2 is a block diagram denoting structures of the image forming apparatus 1 and the portable terminal 20. As shown in FIG. 2, the image forming apparatus 1 includes: a main CPU 201 as the control unit 19 generally controlling the whole image forming apparatus 1, an ROM as a memory, an RAM 202, a storage device 215 storing information, an image processing unit 204 carrying out image processing, and a communication I/F 214 carrying out information communication with an external apparatus.

The main CPU 201 is connected with a print CPU 205 controlling all the units of the image forming system, a scan CPU 209 controlling all units of an image reading system and a drive controller 212 controlling a driving unit.

When the image forming apparatus 1 is the electronic way, the print CPU 205 controls a print engine 206 forming the electrostatic latent image on the photosensitive drum 13B and a processing unit 207 forming the developing material image.

The scan CPU 209 controls a CCD drive circuit 210 driving a CCD 211. A signal from the CCD 211 is output to the image forming unit 13.

The drive controller 212 is connected with a drive unit 213.

The storage device 215 includes a function table 215A storing the function of the image forming apparatus 1.

The portable terminal 20 includes a CPU 301 as an arithmetic unit, a memory 302 such as the ROM, the RAM and the like, an input/output unit 303 such as a display, a keyboard, a mouse and the like, a communication I/F 304 and a storage device 305.

The portable terminal 20 is connected with the image forming apparatus 1 through the communication I/F 304 and the communication I/F 214.

Figure 3:
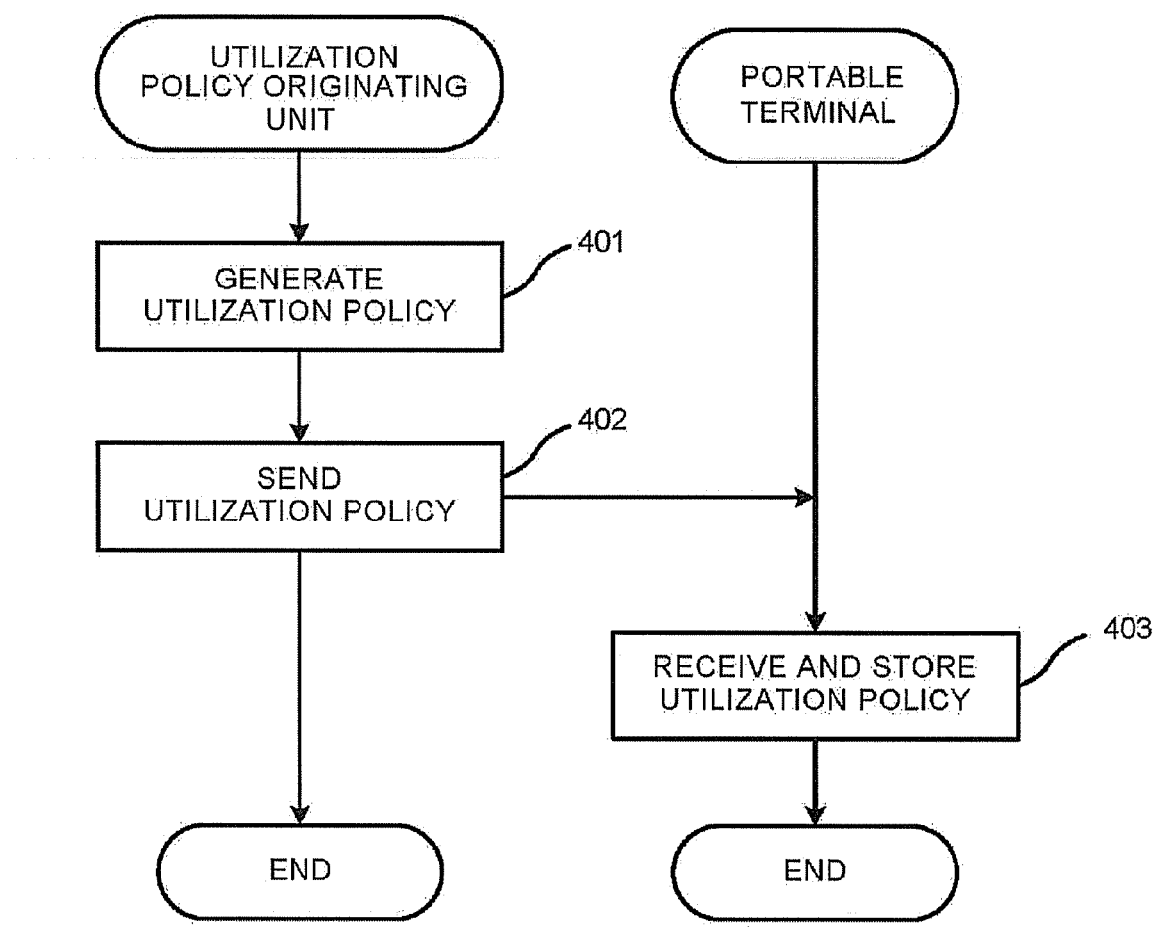
FIG. 3 is a flow chart denoting actions originated by a utilization policy.

FIG. 3 is a flow chart denoting actions originated by the utilization policy. In the present embodiment, the utilization policy originating unit 30 originates the utilization policy recording the function of the image forming apparatus 1, which can be utilized by the user, for the portable terminal 20 of the user temporarily utilizing the image forming apparatus 1.

The utilization policy originating unit can be a so-called computer and can be also a server computer.

As shown in FIG. 3, in ACT 401, the utilization policy originating unit 30 generates the utilization policy.

In ACT 402, the utilization policy originating unit 30 sends the utilization policy to the portable terminal 20. In addition, the utilization policy, for example, is stored in a portable storage device such as a USB memory and the like and can be also transmitted to the portable terminal 20 by using the portable storage device.

In ACT 403, the portable terminal 20 receives the utilization policy, and the utilization policy is stored in the storage device 305.

FIG. 4 is a drawing denoting a data structure of the function table 215A that the image forming apparatus 1 has. As shown in FIG. 4, the function table 215A stores the setting which can be utilized by each function that the image forming apparatus 1 has.

Particularly, the "function" as the function that the image forming apparatus 1 has, the "setting" as the selectable setting of each function, the "apparatus default setting" as the default setting of the image forming apparatus 1, the "enabled setting" as the utilizable setting, the "relation" as the priority order of each setting and the "error selection" as the setting carried out when the setting which is not supported or the setting whose priority is low is selected.

In the example of all data, the function is "print face", the setting is "simplex or duplex", the apparatus default setting is "simplex", the enabled setting is the "simplex and duplex", and the error selection is "default".

FIG. 5 is a drawing denoting an example of the utilization policy. As shown in FIG. 5, the utilization policy stores the "function" denoting the function of the image forming apparatus 1 and "value" as the setting value of each function.

In the example of all the data, the function is the "print face", and the value is "duplex".

FIG. 6 is a flow chart denoting actions of a utilization function regulation of the image forming apparatus 1 based on the utilization policy.

The image forming apparatus 1 retrieves the function table 215A according to the utilization policy sent out from the portable terminal 20 and sends the capability information as the information that the function which is supposed to be provided is selected to the portable terminal 20. The portable terminal 20 generates the user interface for a print instruction denoting the selected function.

As shown in FIG. 6, in ACT 601, the image forming apparatus 1 broadcasts an advertising information packet as an information packet denoting the existence of the image forming apparatus 1 on a network.

In ACT 602, the portable terminal 20 generates a print list as a list of the utilizable print according to the received advertising information packet.

In ACT 603, the portable terminal 20 inputs the selection print as the utilized print.

In ACT 604, the portable terminal 20 sends the requirement of the capability information and the utilization policy to the image forming apparatus 1.

In ACT 605, the image forming apparatus 1 judges whether or not the requirement of the capability information and the utilization policy are received from the portable terminal 20. When the image forming apparatus 1 is judged to receive the requirement of the capability information and the utilization policy from the portable terminal 20, the image forming apparatus 1 enters an ACT 606, and when the image forming apparatus 1 is judged not to receive the requirement of the capability information and the utilization policy, the image forming apparatus 1 returns to ACT 605.

In ACT 606, the image forming apparatus 1 retrieves the function table 215A according to the received utilization policy.

The image forming apparatus 1, when the received utilization policy is included in the function which can be provided, selects this function; when the received utilization policy is not included in the function which can be provided, selects the function which is designated in error setting, determines the provided function and generates the capability information.

In ACT 607, the image forming apparatus 1 sends the generated capability information to the portable terminal 20.

In ACT 608, the portable terminal 20 receives the capability information.

In ACT 609, the portable terminal 20 generates the user interface for the print instruction denoting the selected function.

For example, when the "duplex" is designated aiming at the "print face" in the capability information, the portable terminal 20 can also only display the designated function, so that the "duplex" is only displayed in the "print face" of the user interface.

In addition, the portable terminal 20, for example, in the above example, generates the user interface in the way that the "duplex" and the "simplex" are displayed in the "print face", the "duplex" is displayed by the black, the "simplex" is displayed by a gray and the action is not carried out even though the "simplex" is clicked, so as to denote that the function designated according to the capability information can be used.

In ACT 610, the portable terminal 20 judges whether or not the print instruction exists. When the print instruction is judged to exist, the portable terminal 20 enters ACT 611, and when the print instruction is judged not to exist, the portable terminal returns to ACT 610.

In ACT 611, the portable terminal 20 sends print data to the image forming apparatus 1.

In ACT 612, the image forming apparatus 1 judges whether or not the print data are received. When the image forming apparatus 1 is judged to receive the print data, the image forming apparatus 1 enters ACT 613, and when the image forming apparatus 1 is judged not to receive the print data, the image forming apparatus 1 returns to ACT 612.

In ACT 613, the image forming apparatus 1 forms the image.

As described above, the image forming system of the present embodiment includes: the portable terminal 20 configured to comprise the communication I/F 304 and the storage device 305 storing the utilization policy recording the function of the image forming apparatus 1, which can be utilized by the user; and the image forming apparatus 1 configured to comprise the image forming unit 13 forming the image on the recording medium, the communication I/F 214, the function table 215A storing the setting which can be utilized by each function that the image forming apparatus 1 has, and the control unit retrieving the function table 215A according to the utilization policy received from the portable terminal 20, generating the capability information as the information that the function which is supposed to be provided is selected and sending the capability information to the portable terminal 20, wherein the portable terminal 20 generates the user interface according to the received capability information.

Sequentially, the effect that the function provided by the image forming apparatus 1 for each user can be also limited without carrying out user registration is realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming system, comprising:
   a portable terminal includes a communication interface for carrying out communication and a storage device for storing a utilization policy recorded a function which can be utilized by a user;
   an image forming apparatus includes an image forming unit for forming an image on a recording medium, a communication interface for carrying out the communication, a function table for storing a setting which can be utilized by each function and a control unit; and
   a utilization policy originating unit configured to originate a utilization policy recording the function of the image forming apparatus for the portable terminal, wherein
   the utilization policy originating unit sends the utilization policy to the portable terminal,
   the portable terminal sends the utilization policy to the image forming apparatus,
   the control unit of the image forming apparatus retrieves the function table according to the utilization policy received from the portable terminal, generating capability information that the function which should be provided is selected and sends the capability information to the portable terminal, and
   the portable terminal generates a user interface according to the received capability information.

2. The image forming system according to claim 1, wherein the portable terminal only displays the function designated according to the capability information on the user interface.

3. The image forming system according to claim 1, wherein the portable terminal generates the user interface, so as to display a condition that the function designated by the capability information can be used.

4. The image forming system according to claim 1, wherein the image forming apparatus selects a predetermined function to generate the capability information, if a function which is not supported is recorded in the utilization policy.

5. The image forming system according to claim 1, wherein the image forming apparatus selects the function to generate the capability information according to a predefined priority order, if a low priority function is stored in the utilization policy.

* * * * *